United States Patent Office 3,404,398
Patented Oct. 1, 1968

3,404,398
TERRAIN FOLLOWING SYSTEM EMPLOYING
INTERMITTENT RADIATION
Thomas W. Hoban, Fullerton, and Richard L. Smith,
Anaheim, Calif., assignors to North American Rockwell
Corporation, a corporation of Delaware
Filed June 12, 1967, Ser. No. 646,155
6 Claims. (Cl. 343—7)

ABSTRACT OF THE DISCLOSURE

An automatic terrain following system for airborne use and employing an intermittently-operated pulsed energy directional ranging system in cooperation with a dead-reckoning navigation computer and data matrix storage means. The navigation computer continuously predicts the present positions (relative to a utilizing vehicle) of terrain obstacles sensed during previous operation of the intermittently-operated pulsed energy system (and stored in the storage means). In this way, the detection of the utilizing aircraft is reduced. The low altitude terrain-following flight profile of the aircraft reduces the probability of active detection of the aircraft by a hostile radar system, while intermittent operation of the aircraft's own pulsed energy system decreases the probability of passively detecting and locating such aircraft.

Cross-references to related applications

1. U.S. application Ser. No. 332,996 filed Dec. 20, 1963, by J. O. Anderson, et al., for Terrain Following System.
2. U.S. application Ser. No. 506,295 filed Nov. 4, 1965, by G. P. Bayle, et al., for Vehicle Controller Employing Passive Horizon Sensor.
3. U.S. application Ser. No. 540,053 filed Apr. 4, 1966, by G. P. Bayle, et al., for Terrain Warning Radar System.

Background of the invention

With the advent of modern radar systems for use in both offensive and defensive armament systems, the tactics of airborne military vehicles have necessarily changed. In order for an airborne military vehicle to penetrate deep into a hostile or enemy territory and effectively conduct a military mission, it is required that the vehicle or aircraft fly as low as possible in order to avoid detection by ground-based radar installations. In flying such a low-altitude flight profile, the flight path of the aircraft would desirably follow the profile of the terrain, so as to minimize exposure of the aircraft to a ground-based radar. The safe performance of such a flight profile has employed forward-looking airborne radar means for detecting terrain obstacles at sufficient advance ranges as to allow the pilot or autopilot to evasively maneuver and avoid such obstacles.

Such forward-looking radar systems are employed to determine the associated range and direction of the terrain profile ahead of the utilizing vehicle, relative to a load-limited maximum maneuver profile, whereby the vehicle is controlled so as to avoid the terrain without prematurely "flying-up," and thereby unnecessarily exposing itself. A description of such a radar system and associated radar data processor is included in copending U.S. patent application Ser. No. 332,996 for a Terrain Following System filed Dec. 20, 1963, by J. O. Anderson et al., assignors to North American Aviation, Inc., assignee of the subject invention. Such a system provides terrain-following control signals for utilization in either a pilot's display mode or an automatic flight control mode. However, an associated disadvantage of such radar system is that, while the exposure of the vehicle itself may be minimized, yet the presence of the vehicle is indicated by the forwardly propagated energy continuously transmittted by the radar. Such energy is transmitted above the horizon or transverse terrain profile, and may be sensed by a ground radar "listening" on the other side of a terrain obstacle. Such forwardly propagated energy may even be transmitted at extensive ranges beyond the horizon due to a waveguide effect between the atmosphere and underlying terrain under certain atmospheric conditions and referred to in the art as atmospheric tunnelling or "ducting." By means of such phenomena, a hostile ground radar may obtain substantial advance warning of an area-penetrating military aircraft even though such radar cannot see such aircraft by conventional radio-ranging techniques.

Various terrain sensing methods employing passive sensors, such as infrared sensors and radiometers, have been investigated. One such technique is described in U.S. application Ser. No. 506,295 for Vehicle Controller Employing Passive Horizon Sensor, filed Nov. 4, 1965, by G. P. Bayle, et al., assignors to North American Aviation, Inc., assignee of the subject invention. However, such methods in general either do not provide range information or do not provide sufficiently accurate estimates of range.

Summary of the invention

By means of the concept of the subject invention an intermittently operated pulsed energy system is employed for ranging purposes, while reducing the probability of detecting and locating such ranging device.

In a preferred embodiment of the invention, there is provided a terrain-avoidance system for airborne use and including an intermittently operated directionally ranging system, for intermittently sensing terrain obstacles about a velocity vector or flight path. There is also provided prediction computing means responsively coupled to the ranging system and further responsive to the inertial motion of a utilizing vehicle upon which the ranging system is mounted for predicting the present relative locations of the sensed terrain obstacles (relative to the utilizing vehicle) during time intervals intermediate the operation of the intermittently-operated ranging system.

By means of the above-described arrangement, the utilizing vehicle is enabled to safely fly a low-altitude flight profile so as to escape detection by a hostile enemy radar system, while the intermittent operation of the aircraft's own ranging system reduces the probability of its being either located or jammed. Accordingly, it is an object of the subject invention to provide an actively ranging terrain-avoidance system having improved security.

It is another object of the invention to provide a secure terrain-avoidance system which retains accurate ranging performance.

It is yet another object of the invention to provide a radar-aided terrain profile predictor.

It is a further object to provide radar check pointing of a navigational map computer.

These and other objects, of the invention will become apparent from the following description, taken together with the accompanying drawings in which:

Brief description of the drawings

In the figures, like reference characters refer to like parts.

Description of the preferred embodiment

Figure 1:
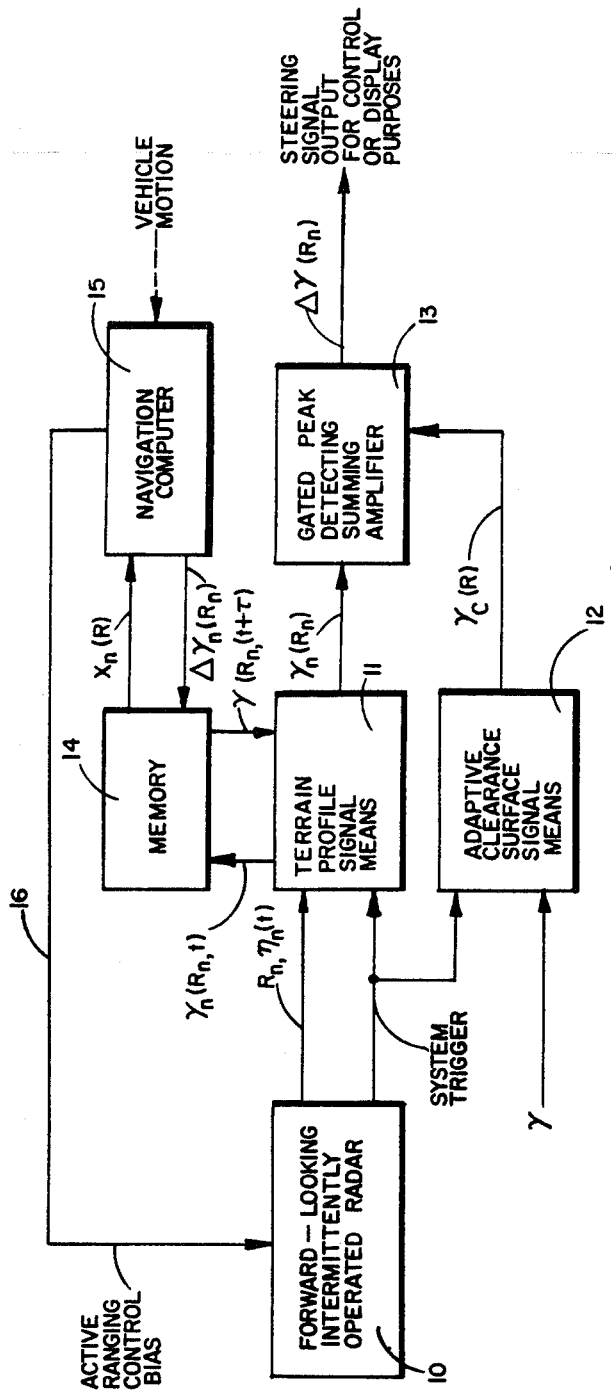
FIG. 1 is a block diagram of a system embodying the concept of the invention.

Referring now to FIG. 1, there is illustrated in block diagram form a system embodying the concept of the invention. There is provided an intermittently-operated directionally-ranging pulsed energy device for sensing terrain obstacles, such as an automatic terrain-following radar system adapted for airborne use in cooperation with an aircraft.

Such a terrain-following intermittently operated system may be comprised of a forward-looking intermittently operated radar system 10 in cooperation with terrain profile signal means 11 for providing signals $\gamma_n(R)$ in response to a pulse transmitted at time, $t$, and indicative of the terrain profile sensed along a desired direction, such as for example, generally parallel to the projected flight path of a utilizing vehicle. Adaptive clearance surface signal means 12, responsive to forward looking sensor 10 and the flight path angle $\gamma$ of the vehicle, provides reference signals indicative of preselected vehicle maneuver limits $\gamma c$ as a function of radar range, R, or range-time. Signal combining means 13 combines the outputs of the terrain profile generator 11 and the adaptive clearance surface signal means 12 to provide a peak-detected terrain-following control signal $\Delta\gamma(R_n)$ indicative of a "worst difference" between the sensed terrain profile and a synthesized maneuver-limited clearance. Such control signal may be fed to a vehicle controller for automatic control of the utilizing vehicle, in such a sense as to reduce the magnitude of or oppose the sense of, the difference signal. Alternatively, such control signal may be fed to a display device or other indicator means, whereby a pilot or human operator may be enabled to manually control the utilizing vehicle. A fuller description of at least one embodiment of a terrain-following radar system is disclosed for example, in U.S. application Ser. No. 332,996 entitled Terrain Following System, filed Dec. 20, 1962, by J. O. Anderson et al., assignors to North American Aviation, assignee of the subject invention.

Where it is desired to optimize the above-described radar system for use in turning maneuvers (where the predicted flight path, and hence the ground track of terrain obstacles of interest, curve away from the vehicle heading or azimuth as a function of range), the radar system 10 may include the look-angle programming means described in U.S. application Ser. No. 540,054 entitled Terrain Warning Radar System, filed Apr. 4, 1966, by G. P. Bayle, et al., assignors to North American Aviation, Inc., assignee of the subject invention.

There is also provided, in the arrangement of FIG. 1, prediction computing means responsively coupled to the terrain-following pulsed energy system and responsive to the motion of the aircraft (in which the system is utilized) for predicting, or computing the relative location of the sensed terrain obstacles during the time-intervals intermediate the operation of the intermittently-operated pulse-energy system. The prediction computing means is comprised of a memory or data matrix storage means 14 for storing position data of terrain obstacles sensed by the radar system, and a navigation computer 15 in cooperation with storage means 14 and responsive to the motion of the utilizing vehicle for predicting the present positions of the sensed obstacles, storage means 14 being responsive to computer 15 for updating the stored position information relative to the sensed obstacles. Such cooperation might include computing predicted changes to such information, and combining such information change with the data stored in memory 14, although any type of data updating or prediction computing scheme may be employed.

Figure 2:
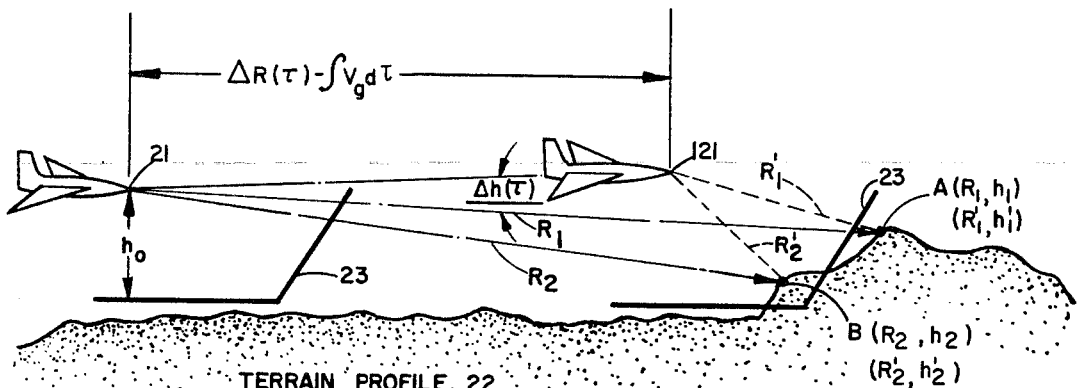
FIG. 2 is a diagram of the geometry of a representative terrain-following problem, illustrating the nature of the solution thereof which is provided by means of the invention.

The updated terrain-obstacle information in memory 14 is utilized by the terrain following processor in like manner as the periodic input data from intermittently operated radar 10, as may be further appreciated from a consideration of FIG. 2. In other words, such data is read or gated out of memory 14 in a manner corresponding to a radar range trace signal.

Referring to FIG. 2, there is illustrated the geometry of a terrain following problem intended to be solved by means of the invention. There is illustrated an aircraft in which the inventive concept may be advantageously utilized and which is located at a first position 21, flying above terrain 22. Such terrain presents two exemplary terrain profile points, A and B, lying along the direction of the forward flight path of the vehicle and protruding above a preselected height, $h_o$, below the flight path ahead of the vehicle.

The preselected vertical distance, $h_o$, represents a preselected or minimum vertical clearance distance desired to be maintained by the aircraft. In general, the terrain following radar system of FIG. 1 provides means for generating a warning signal only when a terrain obstacle has been observed to protrude through the ski-toe shape clearance plane 23 (in FIG. 2), the clearance plane defining a desired clearance between a terrain obstacle and the vehicle, which is over and in close proximity to such terrain. The clearance surface includes a ski-toe shape at a selected forward range ahead of the vehicle to delay the protrusion of a distant terrain obstacle therethrough until the vehicle is nearer, in order to limit the tendency of the vehicle to "leave the deck" or prematurely fly-up in response to the occurrence of such distant terrain obstacle. Such clearance plane 23 is synthesized by blanking signals or bias signals (generated in signal means 12 in FIG. 1) which prevent the generation of a warning signal at the output of summing means 13 (in FIG. 1) in response to a sensed terrain obstacle lying below the synthesized clearance plane.

The terrain profile data, obtained relative to position 21 by means of the pulsed operation of radar 10 and cooperation of terrain profile signalling means 11, is stored in memory 14 for a number of discrete contiguous range bins, as well as being processed by warning signal means 13. For example, the altitude and range data of points A and B in FIG. 2 are stored as $h_1$ in range bin $R_1$ and as $h_2$ in range bin $R_2$, respectively. As may be seen by inspection of FIG. 2, neither of the points A and B protrudes through the clearance surface 23 for vehicle location 21, and therefore the receipt of radar echoes therefrom does not result in the generation of a warning signal.

As the vehicle progresses from point 21 toward the terrain obstacles A and B (in FIG. 2), after radar 10 (of FIG. 1) is turned off, computer 15 and memory 14 cooperate to correct the discrete data stored in memory 14. Such corrected data may then be employed by terrain profile signalling means 11 and summing means 13 (of FIG. 1) in the generation of warning signals for each point of time $\tau$ during the interval $\tau_{max}$ intermediate the intermittent operations of radar 10. Such point in time $\tau$ corresponds to point 121 in FIG. 2.

By means of the cooperation of memory 14 and computer 15, the range and altitude data for each range bin are corrected for the time interval $\tau$, subsequent to the last associated radar data point; and such corrected altitude data is then stored in a corresponding corrected range bin. For example, the radar data for terrain point A in FIG. 2 ($R_1, h_1$), in the $R_1$ range bin of memory 14, would be updated ($R_1', h_1'$) for that point in time $\tau_1$ subsequent to the measurement of $R_1$ and $h_1$, employing the changes $\Delta R$ and $\Delta h$, occurring in the aircraft's position during that interval, as determined by navigation computer 15:

$$R_1'(\tau_1) = R_1 + \Delta R(T_1) = R_1 - \int_0^{\tau_1} V_g d\tau$$

where:

$V_g$ = vehicle ground speed and $$h_1(\tau_1) = h_1 + \Delta h(\tau_1)$$

The new value $h_1'(\tau_1)$ for the relative altitude of point A, relative to vehicle position 121 (in FIG. 2), is stored in range bin $R_1'$. Similarly, new values $h_2'$ and $R_2'$ are determined for point B and the new altitude value $h_2'$ is stored in the range bin $R_2'$.

It is to be appreciated that the new range bin locations for the updated altitude data for the terrain profile represent ever-decreasing ranges as the time interval increases. Therefore, the terrain data is progressively moved in the range bins from the initial radar detection range toward a preselected minimum practical range of maneuvering interest (say, 1,000 feet). When the predicted range for a given terrain decreases to less than such minimum range, such data point is dropped from the memory and is no longer employed in the terrain profile prediction process. The maximum radar-range data point similarly progresses toward the minimum-range bin, during the time interval $\tau$ subsequent to the radar operation. Therefore, the amount of predicted terrain information is progressively reduced and tends to become limited to minimum range data based on predictions of previous maximum radar range information, until memory 14 is depleted.

Upon subsequent operation of the intermittently operated radar 10, memory 14 is refilled with new terrain profile radar data, for use in resuming the prediction computing function. The maximum interval ($\tau_{max}$) between successive radar operations (for a given terrain point) is thus determined by the maximum radar performance range ($R_{max}$), the minimum range interval of interest ($R_{min}$), and the aircraft ground track velocity ($V_g$):

$$\tau_{max} = \frac{R_{max} - R_{min}}{V_g}$$

In other words, $\tau_{max}$ varies inversely with the speed of the aircraft. Where, therefore, the speed of the aircraft may be expected to vary considerably, the control means for intermittent operation of radar 10 (in FIG. 1) may preferably be made responsive (by line 16) to navigation computer 15 for controlling the interval, $\tau_{max}$, as an inverse function of such speed by the use of voltage controlled periodic signalling means in driven cooperation with a function generator, as is well understood in the analog computing art.

In one system design, intended for practical application for a vehicle having a speed of 1,000 feet per second and employing the concept of the invention, a nominal interval $\tau_{max}$ of intermittent operation of five seconds has been considered, corresponding to an interval of 5,000 feet. However, each specific design application may be based upon design trade-offs of the desired reduction in radiation versus allowable increase in the means terrain-clearance performance.

Figure 5:
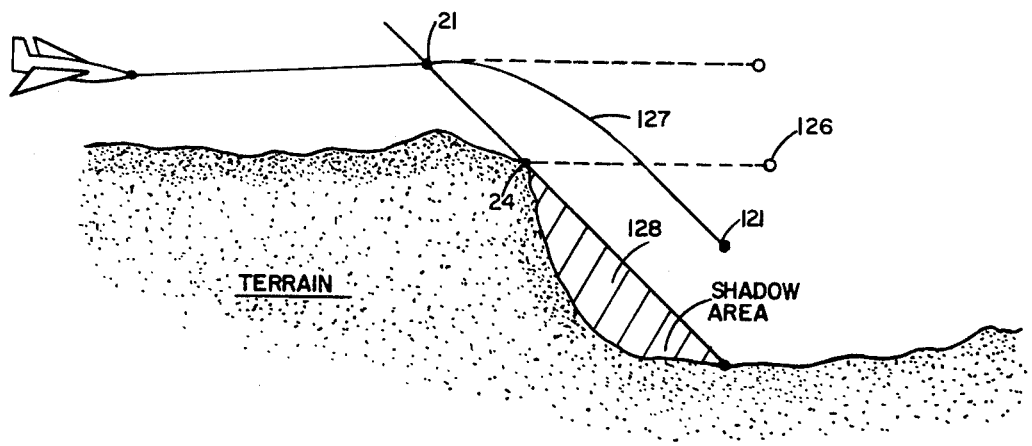
FIGS. 3, 4 and 5 are diagrams of the geometry of several terrain-profile situations in which radar shadows are involved.
Figure 3:
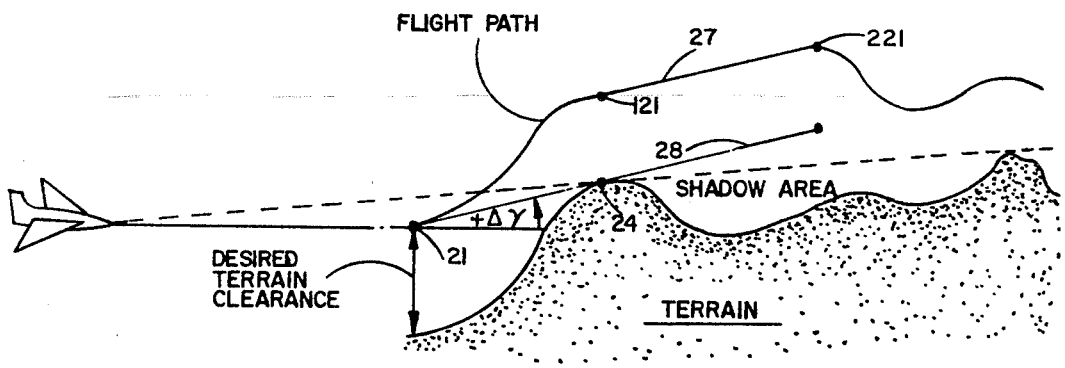
Figure 4:
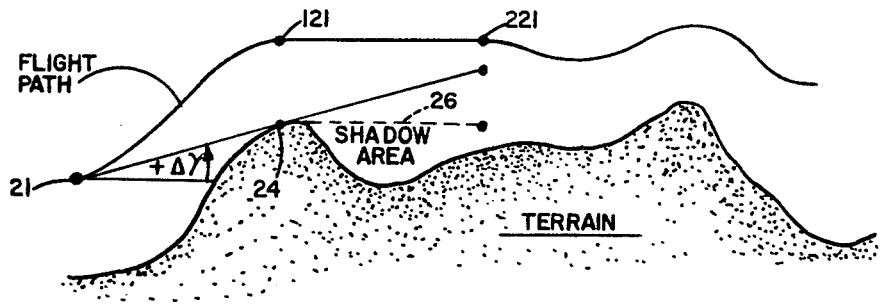

Another ancillary aspect of interest in the terrain profile prediction process arises from a consideration of the effects of radar shadows caused by terrain prominences at intermediate ranges, as shown in FIGS. 3, 4 and 5.

Referring to FIG. 3, it is to be appreciated that as the utilizing aircraft (controlled by means of the inventive concept) approaches a terrain obstacle 24 which is located at an altitude above the vehicle, no radar data is obtained beyond the range of such obstacle. Where the intermittent operation of radar 10 occurs at point 21 and next at a subsequent time $\tau_{max}$ corresponding to a position a point 121 within the preselected minimum range of terrain would ordinarily run out of data when the vehicle reached a point 121 within the preselected minimum range of terrain obstacle 23. In other words, the maximum-range radar data, represented by the detection of prominence 24 from position 21, would have progressed through the range bins (toward the minimum range) of memory 14 during the subsequent prediction computing process, until (at position 121) no data would be left in the memory. In such state, no terrain data would be available to the terrain profile signalling means 11 of the automatic terrain-following system of FIG. 1, during the interval between points 121 and 221 in FIG. 2. In the absence of such terrain profile data, the aircraft might be induced or maneuvered into that immediate portion of the terrain profile for which neither radar data nor prediction data is available. Accordingly, an extrapolation function is included in the prediction computing means for extrapolating on a radar data point occurring at less than the preselected radar maximum range, such data being extrapolated out to the interval $\tau_{max}$, corresponding to the maximum radar range.

Where such radar-shadow producing terrain prominence 24 is at an altitude or sighting angle above the aircraft (sgn$\Delta\gamma$=positive), a horizontal extrapolation is to be preferred (curve 26 in FIG. 4), in order to avoid "ballooning" or unnecessary upward altitude excursions in the flight path (curve 27 in FIG. 3 due to slant angle extrapolations (curve 28 in FIG. 3). Such extrapolation is conveniently done by computer 15 initially programming the remaining (empty) range bins of memory 14 with the radar altitude data of the intermediate-range terrain obstacle in response to the combination of: the presence of a maximum range radar data point at less than the preselected maximum range, and an associate altitude for such radar range which altitude is greater than that of the aircraft. Such sub-routine programming is well understood in the computer art.

Where, however, the shadow-producing prominence 24 is at an altitude or sighting angle below the aircraft (sgn$\Delta\gamma$=negative), a slant angle extrapolation is to be preferred (curve 128 in FIG. 5), in order to avoid maintaining an unnecessary altitude excursion above the terrain profile portion immediately beyond the prominence due to horizontal extrapolation (curve 126 in FIG. 5). Such slant angle extrapolation is conveniently done by computer 15 initially programming the remaining (empty) range bins of memory 14 with the radar altitude data of prominence 24 and range-scaling such data for such range bin, in response to the combination of a maximum range radar data point at less than the preselected maximum range and an associated altitude which is less than the aircraft altitude. In other words, the extrapolation altitude:

$$-h_i(R_i) = -h_1 \frac{R_i}{R_1}$$

where $$R_i < R_1$$

Such alternative subroutine programming is also well understood in the computer art.

As an alternative to separately programming the intermittent operation of the radar as an inverse function of vehicle ground speed $$\left( \frac{R_{max} - R_{min}}{V_g} \right)$$

and performing the extrapolation function, described above, the intermittent operation of the radar may merely be programmed in response to the emptying of the memory. In other words, as the maximum radar range data is updated and progresses in and out of a preselected minimum range bin during the prediction computing process, such depleted state of the minimum range bin of the memory may be used as a logic control state for switching-on the intermittently operated radar, regardless of the cause of such range bin state. Such alternative, however, may increase the average amount of propagated radiation.

Figure 6:
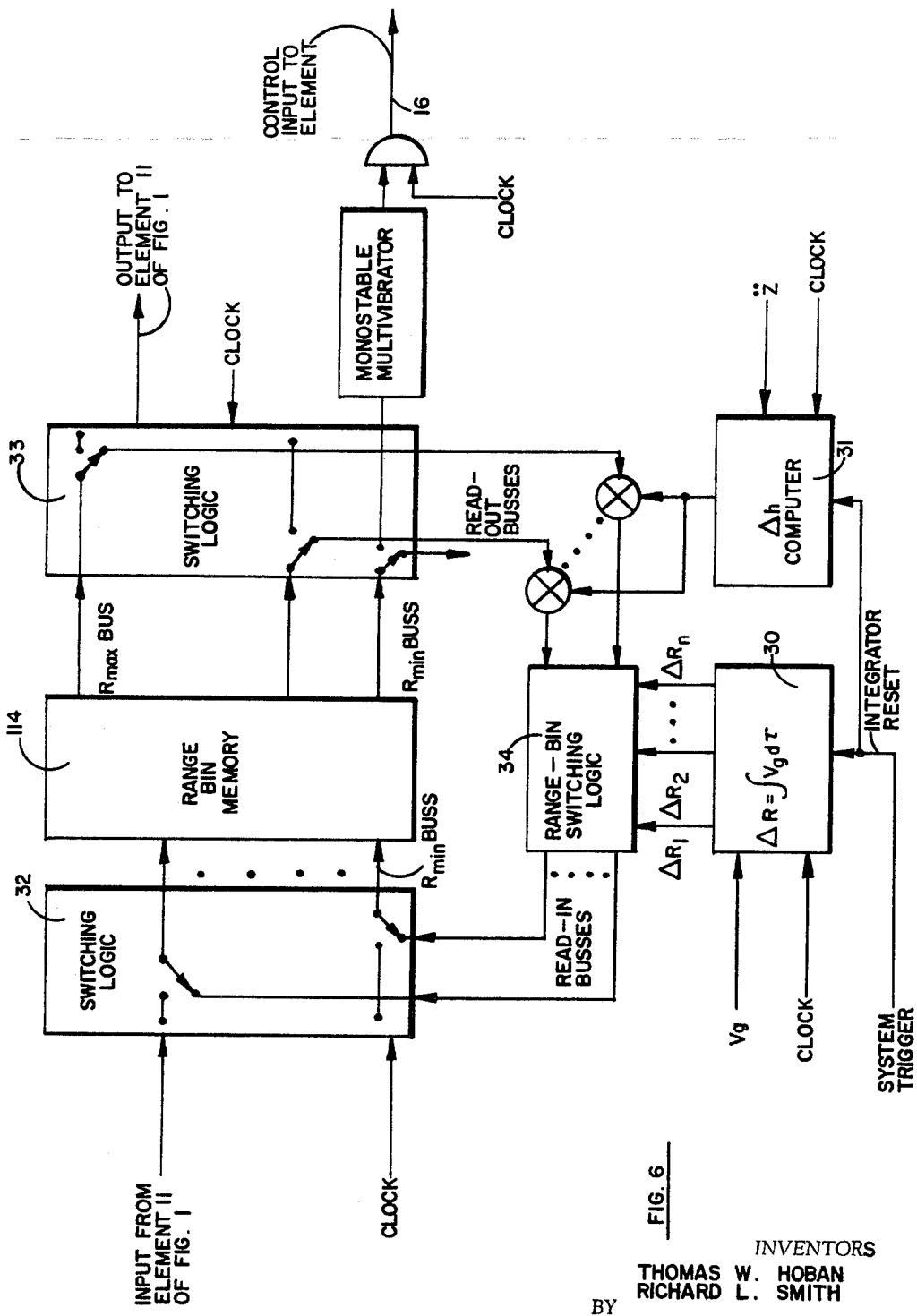
FIGS. 6 and 7 are schematic arrangements of portions of the memory and computer elements of FIG. 1.
Figure 7:
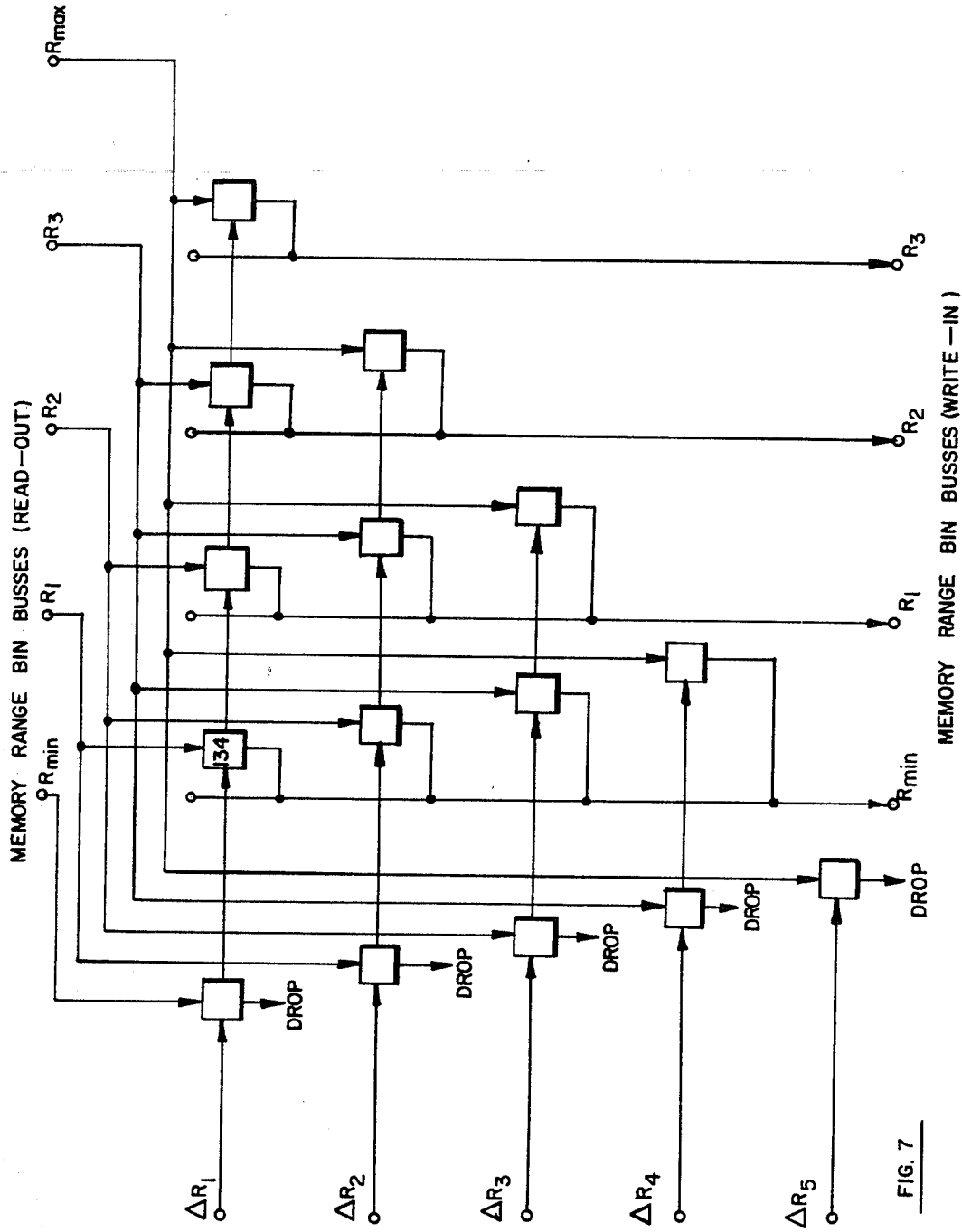

An exemplary mechanization of such arrangement of blocks 14 and 15 (of FIG. 1) is shown in FIGS. 6 and 7.

Referring to FIG. 6, there is illustrated means 30 for computing changes in range, $\Delta R$, and means 31 for computing changes in altitude, $\Delta h$, corresponding to functional portions of computer block 15 of FIG. 1, the $\Delta h$ output being combined with the altitude value read-out on the range-bin read-out busses of a range-bin memory element 114. The output of range computer 30 is a switching control signal on one of a number of switching control lines, each representing a mutually exclusive one of a plurality of successive discrete values of range change. As illustrated in FIG. 6, clocked switching logic 32 is interposed between the input to memory 114 and an output of element 11 (of FIG. 1) and clocked switching logic 33 is interposed between the read-out of memory 114 and an input to element 11 (of FIG. 1). In this way, the read-out range-bin busses of memory 114 are alternatively read-out by the radar data processor of FIG. 1 and updated by computer elements 30 and 31 in cooperation with range-bin switching logic means 34.

Range-bin logic 34 cooperates with the incremental range-switching control output of range computer 30, to switch the updated altitude data on the read-out range bin busses to updated range-bins in memory 114, as shown more particularly in FIG. 7.

As shown in FIG. 7, the range bin switching logic means 34 (of FIG. 6) may be comprised of a matrix of switch element elements corresponding to a plurality of linear arrays, each array responsively coupled to a mutually exclusive one of the $\Delta R_n$ input lines (from range-computer 30 of FIG. 6), each switch 134 interconnecting an associated read-out range-bin buss and write-in range-bin buss in response to a switching control input. For example, a least significant or first range-control input on line $\Delta R_1$ excites the top row of switches in FIG. 7, whereby the $R_{max}$ read-out buss is connected to the $R_3$ write-in buss; the $R_3$, $R_2$ and $R_1$ read-out busses connected to the $R_2$, $R_1$ and $R_{min}$ write-in busses, respectively; and the data on the $R_{min}$ read-out buss is dropped. In other words, in response to the range-bin switching control input on the least significant switching line $\Delta R_1$, the range-bin data is shifted by a least range-bin interval. A switching control input on a line corresponding to a larger incremental range-interval produces a correspondingly larger shift. For example, an input on the $\Delta R_4$ line interconnects the $R_{max}$ read-out buss and the $R_{min}$ write-in buss, the read-out data at read-out ranges less than $R_{max}$ being dropped from the write-in process.

Of course, in order to be able to update the discrete range-trace data, it is necessary to include an "erase" mode or destructive read-out mode (not shown), so "clearing" the minimum-range range-bins first, in order that the memory 114 may accommodate the data for a larger range, updated for a lesser range. Accordingly, as shown in FIG. 7, the associated delay in a change of state for a given one of the switches 134 in the lineal array associated with a given $\Delta R_n$ control line may be utilized to delay the switching of a subsequent switch in the array, in the manner of a shift register. For example, in the $\Delta R_1$ array of switches 134, the change in state of the $R_{min}$ "drop" switch (in response to a $\Delta R_1$ switching control input) next turns-on switch 134 on the $R_{min}$ write-in buss; the change-in state of $R_{min}$ buss switch 134 next turns-on the $R_1$ write-in buss switch (of the $\Delta R_1$ array), the change in state of the $R_1$ write-buss switch subsequently turning-on the $R_2$ write-in buss switch, which subsequently turns-on the $R_3$ write-in buss switch.

Also included in the arrangement of FIG. 6 is means for providing a control signal on line 16 (of FIG. 1) for regulation of the operation of the intermittently operated pulsed energy system 10 (of FIG. 1) in response to a preselected change of state of the minimum range bin read-out buss; corresponding to the depletion of memory means 114.

Although the inventive concept has been described and illustrated in FIGS. 6 and 7 in terms of five discrete range-change range bin control lines and five discrete range bins, it is clear that the concept of the invention is not so limited and that any combination of quantities of discrete range-change control lines and range-bins may be employed.

Accordingly, there has been described a terrain-following employing an intermittently operated range sensor. Such intermittent operation reduces the likelihood of detection of a vehicle using such system, while yet providing accurate range information for terrain-following purposes. Also, such intermittent system operation (in combination with a vehicle terrain-following flight path) makes difficult the location, and delays the unmasking, of a hostile-area penetrating vehicle using such system. Such difficulty requires a larger number of electronic counter measure stations dispersed over a defended area in order to unmask the vehicle, while such delay is useful to a military penetration mission against an area in which the defense threat has long reaction times. Further, such intermittent radiation feature reduces the likelihood that an anti-radiation type missile, if launched against the vehicle, would be able to lock-on and track the vehicle to a point of collision or impact. Accordingly, an improved terrain-following system has been described.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a terrain avoidance system for airborne use, the combination comprising:

an intermittently-operated directionally ranging pulsed energy system for intermittently sensing terrain-obstacles about a velocity vector; and prediction computing means responsively coupled to said pulsed energy system and responsive to the inertial motion of said pulsed energy system for predicting the relative locations of said sensed terrain obstacles relative to said system during time-intervals intermediate the operation of said intermittently operated pulsed energy system.

2. The device of claim 1 in which said prediction computing means includes data matrix storage means for storing position data of terrain obstacles sensed by said pulsed energy system; and a navigation computer responsive to said storage means and said inertial motion for predicting the present relative locations of said sensed obstacles, said storage means being further responsive to said computer.

3. The device of claim 2 in which said pulsed energy system is responsively coupled to said navigation computer for varying the intervals intermediate successive intermittent operations of said pulsed energy system as an inverse function of the ground speed of said pulsed energy system.

4. The device of claim 1 in which the rate of operation of said intermittently-operated system is varied as a function of the ground speed of said system.

5. The device of claim 1 in which said prediction computing means includes range-bin memory means for storing terrain obstacle altitude data for a plurality of successive discrete range-bin intervals;

altitude computing means for computing changes to said stored altitude data resulting from altitude changes of said system during intervals intermediate the operation of said intermittently-operated pulsed-energy system;

range computing means for computing changes to the associated range data of said stored altitude data resulting from motion of said system during intervals intermediate the operation of said intermittently operated pulsed energy system; and range-bin switching logic responsively coupled to said range computing means for switching said changed terrain obstacle data into range bins of said range-bin memory means and corresponding to said computed range data changes in said stored data.

6. The device of claim 5 in which the operation of said pulsed energy system is regulated in response to a preselected change-of-state of a minimum-range range-bin of said range-bin memory means.

References Cited

UNITED STATES PATENTS 3,302,198  1/1967  Selvin et al. _____ 343—7

RICHARD A. FARLEY, *Primary Examiner.*

T. H. TUBBESING, *Assistant Examiner.*